United States Patent [19]
Hocker et al.

[11] Patent Number: 6,099,097
[45] Date of Patent: Aug. 8, 2000

[54] SNAP-FIT DOOR HINGE ASSEMBLY AND METHOD

[75] Inventors: Keith J. Hocker, San Jose; Ron Barnes, Livermore, both of Calif.

[73] Assignee: Sun Microsystems, Inc., Mountain View, Calif.

[21] Appl. No.: 08/882,912

[22] Filed: Jun. 26, 1997

[51] Int. Cl.[7] .................................................. B65D 43/24
[52] U.S. Cl. ...................... 312/327; 312/223.2; 16/257; 16/225; 16/DIG. 13
[58] Field of Search ................................ 312/223.2, 327, 312/328, 265.5, 265.6, 263, 257.1; 16/257, 225, DIG. 13; 361/681; 220/831, 836, 840

[56] References Cited

U.S. PATENT DOCUMENTS

| | | | |
|---|---|---|---|
| 2,605,926 | 8/1952 | Casey | 220/338 |
| 2,733,830 | 2/1956 | Ruskin | 16/257 X |
| 4,282,983 | 8/1981 | Swartzbaugh | 220/337 X |
| 4,448,327 | 5/1984 | Gahm | 220/337 X |
| 4,821,751 | 4/1989 | Chen | 220/338 X |
| 5,638,838 | 6/1997 | Lombardi | 220/338 X |

FOREIGN PATENT DOCUMENTS

| | | | |
|---|---|---|---|
| 2341092 | 2/1974 | Germany | 16/257 |

*Primary Examiner*—Janet M. Wilkens
*Attorney, Agent, or Firm*—Flehr Hohbach Test Albritton & Herbert LLP

[57] ABSTRACT

A snap-on hinge assembly (20) for pivotally mounting a door (14) to a base (12) including a pivot saddle or pin (22) and a snap-acting gripping assembly (24) formed to slidably mount over, and resiliently snap into gripping engagement with, pivot pin 22. The gripping assembly (24) and pivot pin (22) are formed for pivoting of the gripping assembly (24) around the pivot pin (22) while in gripping engagement therewith, and the hinge assembly (20) further is formed with over-travel stopping surfaces (15, 38) positioned so that reaction forces between the door (14) and the base (12), upon relative engagement in an open position, urge the gripping assembly (24) and the pivot pin (22) in a direction preventing unsnapping of the gripping assembly (24) from the pivot pin (22).

18 Claims, 4 Drawing Sheets

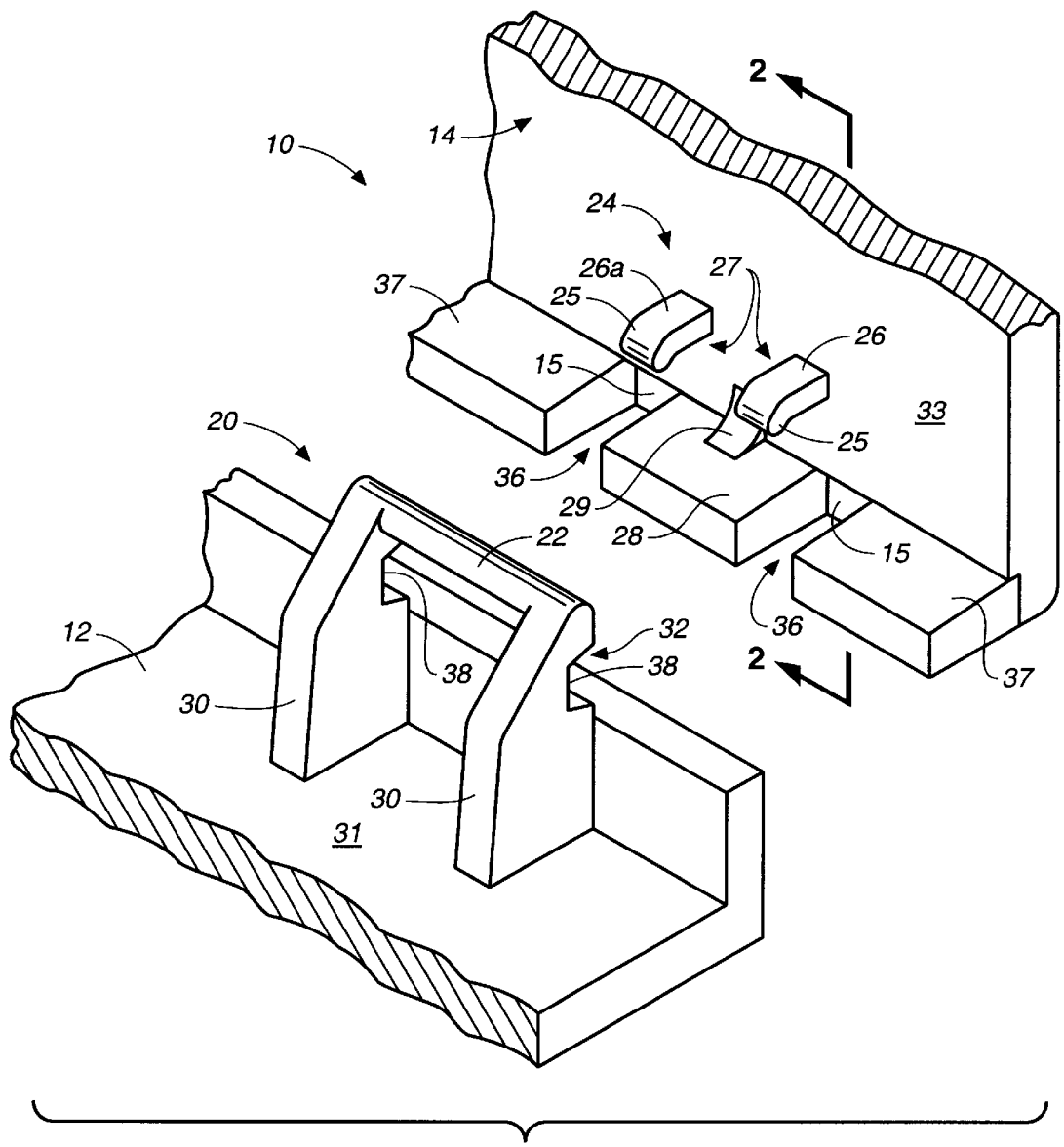
FIG._1

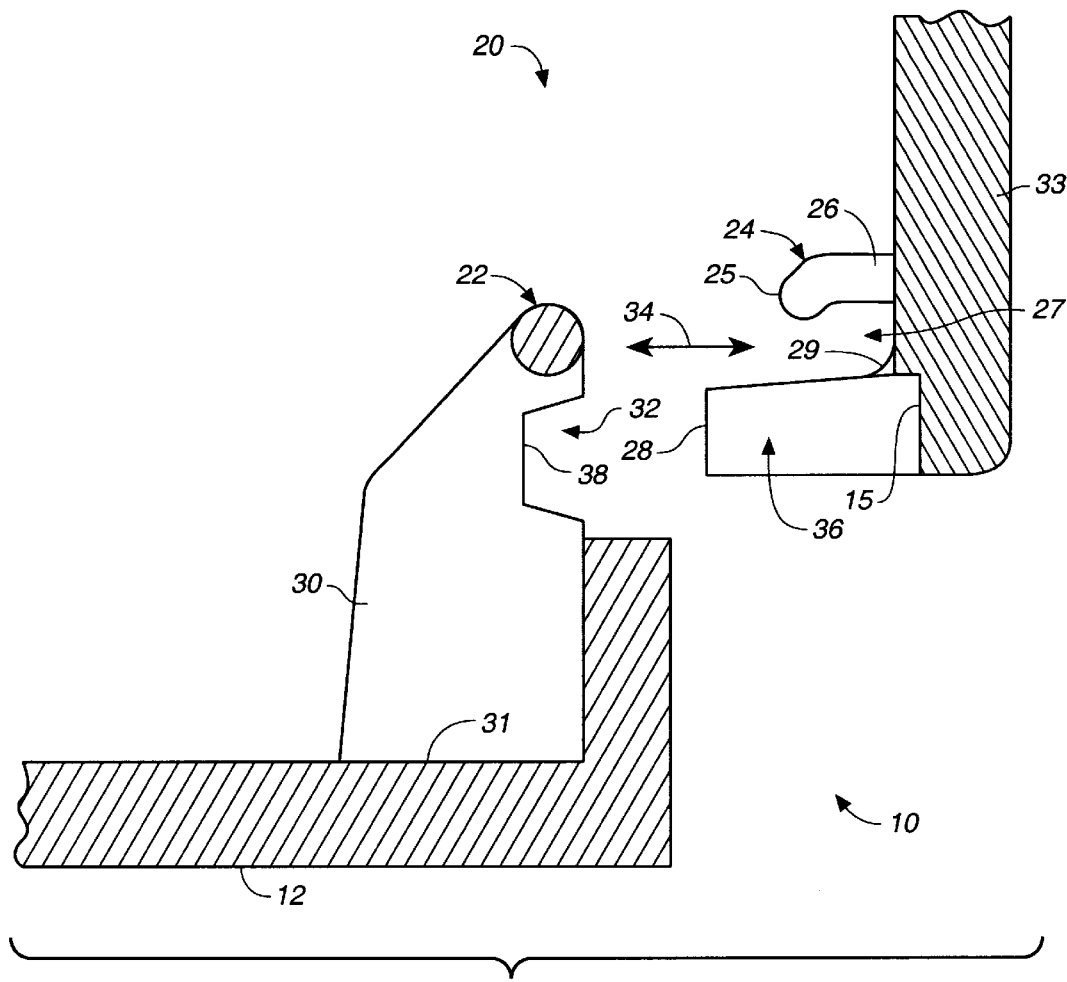
FIG._2

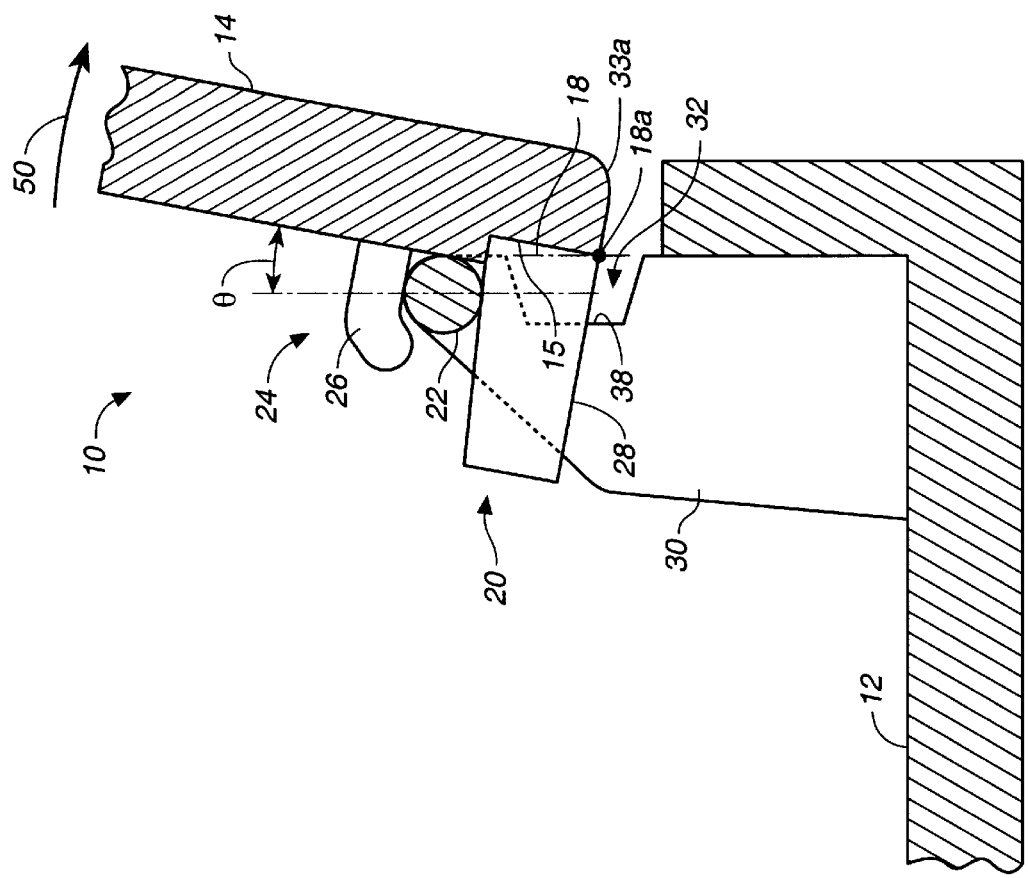
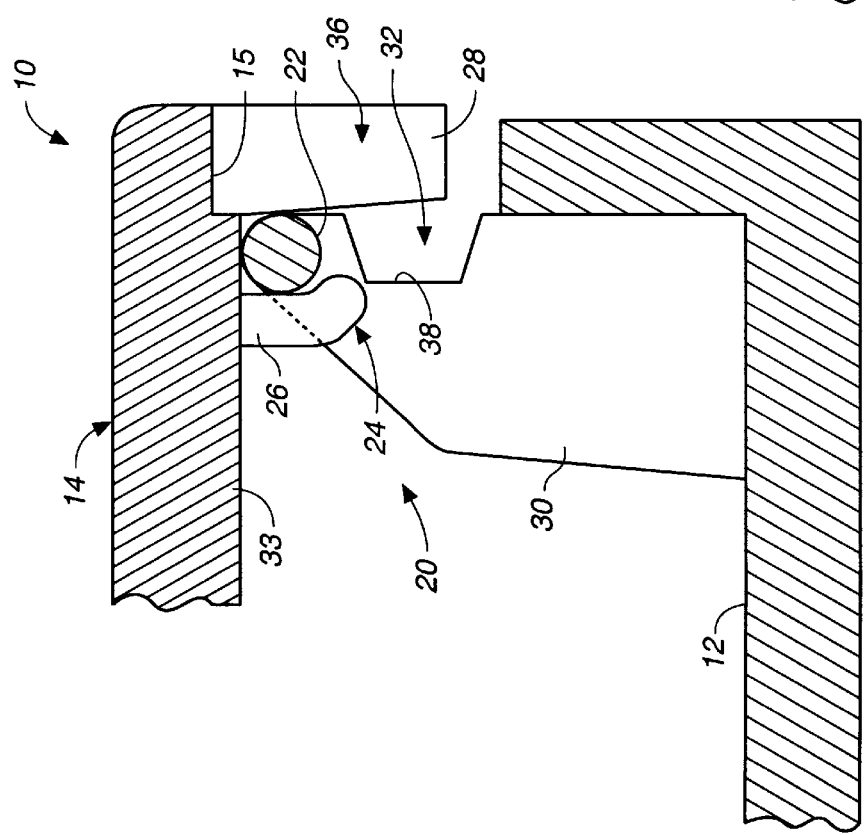

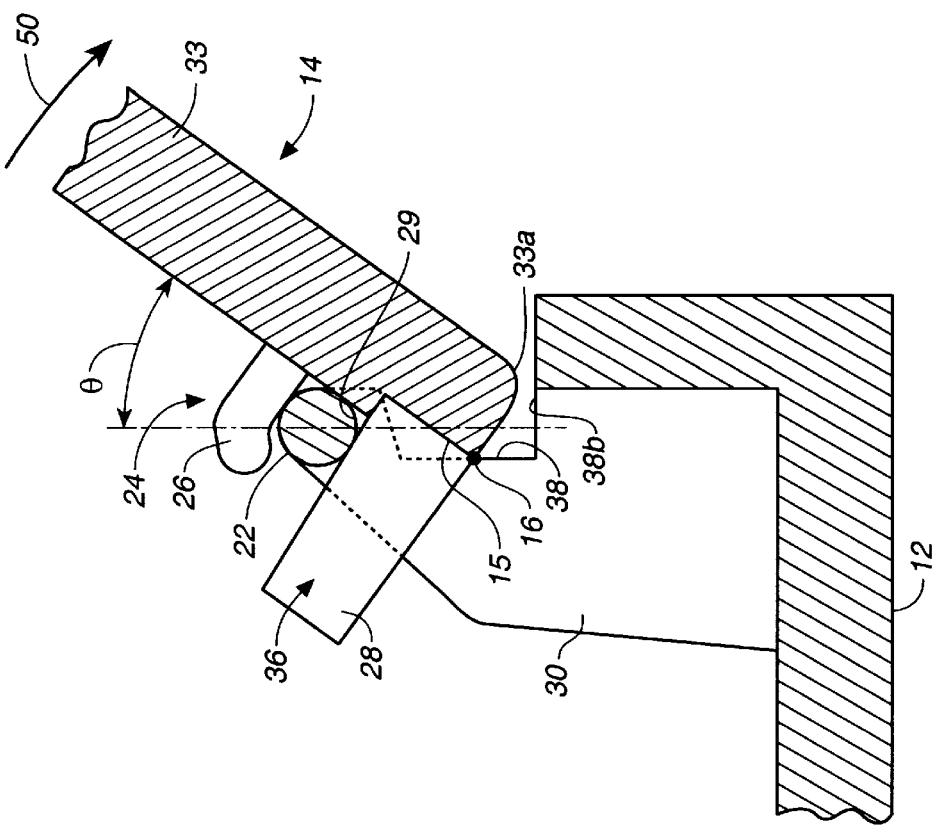
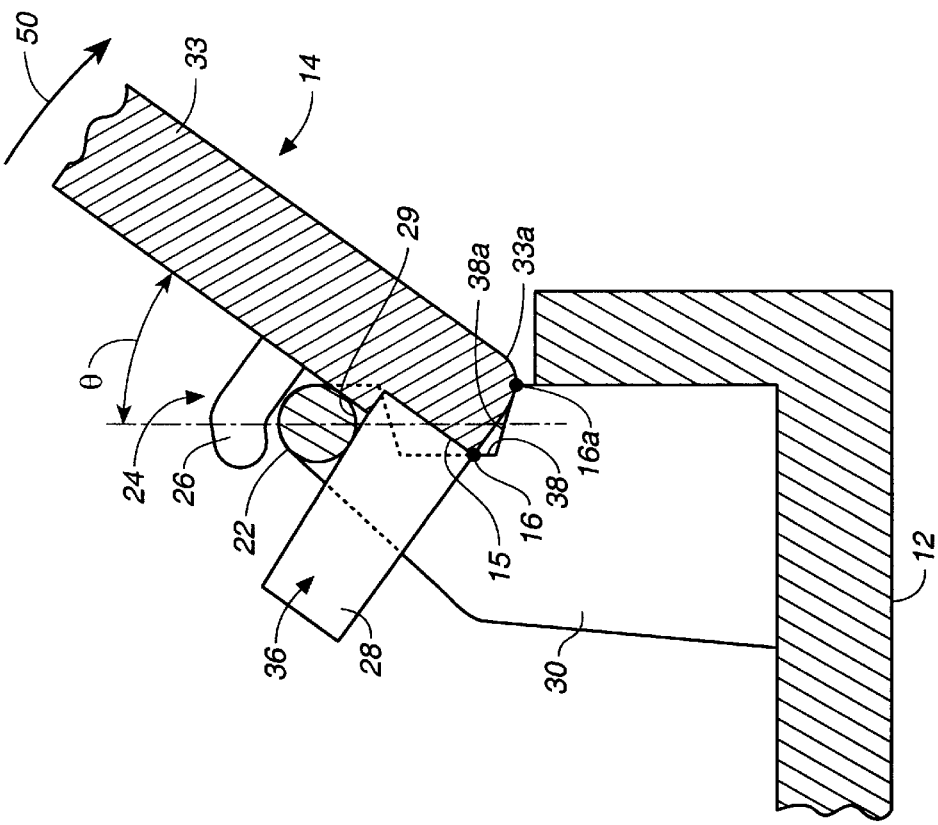

SNAP-FIT DOOR HINGE ASSEMBLY AND METHOD

TECHNICAL FIELD

The present invention is related to door hinges, and more particularly, to door hinges of the type which are often used in electronic housings or cabinets.

BACKGROUND OF THE INVENTION

A wide variety of door hinges are used in the electronics industry for pivotally connecting a door or panel to the front of a cabinet, housing or other enclosure structure for electronic equipment such as computer hardware. Typically, such door hinges include a first part or component which is attached to the back surface of the door, often by fasteners or adhesives, and a second part or component which is attached to a base structure, framework or inner wall of the enclosure or housing. The first and second parts are hinged together and mount the panel or door to the cabinet or enclosure. Mounting conventional hinge assemblies to plastic electronic cabinetry, however, can be tedious and add undesirably to the cost.

Snap-fitting or snap-on panels, of course, are broadly known in connection with electronic apparatus housings. Thus, resilient plastic fingers have been used to latch panels to plastic housings. Such systems, however, have most typically been employed in applications in which the panel does not need to rotate. Thus, resilient or snap-on fingers have been widely used to secure a cabinet panel in place in a fixed position, and removal of the panel is accomplished merely by prying the panel away from the structure to which it is mounted, or urging the resilient fingers out of engagement with the shoulders which they latch against to release the panel.

When a panel or door is to be rotatably or hingedly mounted to a structure, the problems attendant to such a mounting become more difficult. The hinge must accommodate rotation of the panel and yet it must securely mount the panel or door to the structure for the full range of motion of the door.

Plastic snap-fit door hinge components may be monolithically formed with the plastic housing and door pieces which are to be hinged together, namely, one part of the hinge can be provided on the cabinet and the other part of the hinge provided on the door. Such hinge assemblies, however, need an over-travel stop that limits door pivoting when the door is fully opened. Thus, a stop surface on the body of the door will engage an end stop structure on the housing to which it is mounted to prevent further rotation of the door. Such over-travel stops, however, also can produce reaction forces tending to pry the hinge components apart and thereby pry the door off the cabinet or enclosure. Thus, in the open position, the weight of the door and/or the force used to open the door can easily result in the door hinge becoming pried apart by the over-travel stop, such that the door unsnaps from the cabinet or enclosure.

To counteract the problem of a snap-fit hinge becoming easily pried apart when the door is fully opened, it is possible to design the resilient snap-fit connection between the two parts of the hinge to be quite stiff or strong. The disadvantage of this approach is that, if the snap-fit connection is designed with little resiliency, thereby securely holding the hinge together even at the door's fully opened position, it correspondingly becomes difficult to easily snap together the hinge parts when the door and cabinet are first being assembled. Moreover, it is also correspondingly difficult to easily snap apart the hinge should this be desired.

What is instead desired is a hinge assembly which easily snaps together and apart allowing a door to be easily installed or removed from the front of an enclosure, but which also does not simply snap apart when the door reaches its fully opened position.

Accordingly, it is an object of the present invention to provide a snap-fit door hinge assembly, and method for forming such an assembly, which will not become accidentally pried apart at any point over the full range of door motion, including when the door is in its fully opened position.

It is another object to provide a plastic snap-fit door hinge assembly having parts which are easily snapped together into a secure, interlocked relationship that will enable a full range of door motion.

It is another object to provide a plastic snap-fit door hinge assembly which can easily be snapped apart, allowing for easy removal of the door from the structural member to which it is mounted.

It is another object to provide a plastic snap-fit door hinge which can be easily assembled together, is inexpensive to construct, is suitable for formation using convention plastic forming techniques, requires little or no maintenance and is durable.

DISCLOSURE OF THE INVENTION

The snap-fit hinge assembly of the present invention is comprised, briefly, of two components, namely, a pivot saddle or pin, and a snap-acting gripping assembly, such as a pair of resilient fingers, formed to slidably mount over, and resiliently snap into gripping engagement with, the pivot saddle. The gripping assembly and the pivot saddle are further formed for pivoting of the gripping assembly around the pivot saddle while in gripping engagement. Finally, the hinge assembly is formed so that reaction forces between a door hinged to a base structure using the assembly will not urge the gripping assembly to unsnap from the pivot saddle. In the preferred form the pivot saddle mounts are notched to provide over-travel stop surfaces positioned to receive stop surfaces on the door, with the depth of the notch and the position of the stop surfaces being selected so that the door will rotate beyond a position which would pry the fingers off the pivot saddle to a position pulling the hinge parts together in a manner preventing unsnapping.

Also disclosed is a method of providing a rotatable snap-on hinge assembly for securing a door to a housing or enclosure structure such that the hinge is prevented from snapping apart when the door is fully opened and over-travel stop surfaces are interengaged.

BRIEF DESCRIPTION OF THE DRAWINGS

FIG. 1 is an exploded, top perspective view of a snap-fit door hinge assembly constructed in accordance with the present invention.

FIG. 2 is an exploded sectional view of the door hinge assembly of FIG. 1 taken along the line 2—2 thereof.

FIG. 3A is a cross-sectional, side elevation view, of the door rotated to a closed position.

FIG. 3B is a cross-sectional, side elevation view corresponding to FIG. 3A, with the door rotated to a partially opened position.

FIG. 3C is a cross-sectional, side elevation view corresponding to FIG. 3A, with the door rotated to a fully opened position.

FIG. 3D is a cross-sectional, side elevation view corresponding to FIG. 3C of an alternative embodiment of the hinge assembly of the present invention.

BEST MODE OF CARRYING OUT THE INVENTION

As is best seen in FIG. 1, a portion of an enclosure assembly, generally designated 10, is illustrated in which a snap-fit hinged assembly, generally designated 20, is provided and mounts a door structure 14 to a framework or base structure 12. Enclosure assembly 10 is preferably an enclosure or housing of the type widely used in the electronics and computer industry. As used herein, "enclosure structure" does not require that the structure fully enclose a space, and the expression includes any framework or housing to which a door or panel might be rotatably mounted.

Enclosure structure 10 and hinge assembly 20 preferably are constructed of a lightweight plastic, such as ABS, polyvinyl chloride, or polycarbonate, with ABS being most preferred. One part or component of hinge assembly 20 is advantageously monolithically formed with door structure 14 while another part or component of hinge 20 is monolithically formed with base or housing 12. Base structure 12 can be a plastic injection molded computer housing, and door structure 14 can be similarly formed injection molded pivotable panel. It will be understood, however, that hinge assembly 20 can be used for other applications and constructed of materials other than plastics, all keeping within the scope of the present invention.

Hinge assembly 20 preferably comprises a pivot saddle or pin 22, with an associated mounting structure 30, and a snap-acting gripping assembly 24. Pivot saddle 22 is shown in the drawing as carried by base structure or housing 12, but pivot saddle 22 may instead be mounted to door structure 14. Similarly, gripping assembly 24 is shown carried by door structure 14, but it may instead be carried by base structure 12. Moreover, it is to be understood that while the present hinge assembly is well suited to be monolithically formed with the door and housing, the hinge components also could be provided as separate pieces which are secured by fasteners or adhesives to door structure 14 and base 12, all keeping within the scope of the present invention.

As is seen in FIG. 1, gripping assembly 24 most preferably includes a pair of laterally spaced-apart, resilient, gripping fingers 26 and 26a which are opposed to a wall or tab 28 and together define a gap or longitudinally extending socket 27 therebetween. As is also seen, pivot saddle 22 is preferably provided by a cylindrical pin or axle which is supported by at least one saddle support mount, and in this case by a pair of mounts 30. Mounts 30 support pivot pin 22 in a generally parallel orientation and in spaced relation to housing wall 31. Gripping assembly 24 is formed to slidably mount over, and to resiliently snap into and out of gripping engagement with, pivot saddle 22, with socket or gap 27 between gripping fingers 26, 26a and tab 28 being dimensioned to tightly receive and hold pivot saddle 22.

Specifically, as can be seen in FIGS. 1 and 2, gripping fingers 26, 26a and opposed wall or tab 28 extend in a generally perpendicular orientation from front wall 33 of door structure 14. Hinge assembly 20 is snap-fit together by moving at least one of door structure 14 and base structure 12 in a mounting direction, as indicated in FIG. 2 by arrow 34 showing movement of the door toward base or housing 12. Mounting direction 34 is generally the same direction in which gripping fingers 26, 26a and opposed tab 28 extend from door wall 33, and the removal or unmounting direction would be opposite to arrow 34.

As can also be seen, gripping fingers 26, 26a can be formed with an inwardly inclined or curved inner end 25 adjacent gap 27, such that curved ends 25 wrap around or capture pivot pin 22 in socket 27. A fillet surface 29 can be provided intermediate fingers 26, 26a which is formed to mate with pin 22 and cooperate with finger ends 25 in engaging and guiding pivot pin 22 during rotation. Finger ends 25 also provide a narrowed neck or passageway to socket 27 which is smaller than the diameter of pivot pin 22 and which requires resilient displacement of fingers 26, 26a away from tab wall 28 in order for the pivot pin 22 to snap into or out of gap or socket 27. Thus, gripping fingers 26, 26a firmly resiliently retain the pivot pin in gap 27 for rotation between the fingers and opposed tab 28.

FIGS. 3A, 3B and 3C show hinge assembly 20 in its snapped together condition with door structure 14 shown, respectively, in a closed position, a partially opened position, and a fully opened position with respect to base structure 12. As can be seen, gripping assembly 24 is formed for pivoting about pivot saddle 22 while remaining in gripping engagement with the saddle from the closed position of the door in FIG. 3A to the fully opened position of the door in FIG. 3C. Accordingly, door structure 14 and gripping fingers 26, 26a and opposed tab 28, also rotate about pivot saddle 22 as door structure 14 is moved between closed and fully opened positions.

In order to prevent over-travel of door structure 14 in the open position, the present hinge assembly also includes a dead stop or end stop structure. When door structure 14 reaches its fully opened position, as is seen in FIG. 3C, an end stop surface 15 on door structure 14 will engage an end stop surface 38 on pivot pin support mounts 30 at a contact point 16, thereby preventing door structure 14 from being opened any further. Specifically, end stop surfaces 15 are provided on door structure 14 at the bottom of a pair of slots 36 in door wall 37. Slots 36 also define tab 28, as is best seen in FIG. 1.

As can be seen from FIG. 3C, any attempt to pivot door 14 further around pin 22 urges the lower edge of door end stop surface 15 against vertical notch surface 38, and in fact, the door begins to pivot about point 16 in a clockwise direction. It is an important feature of the present invention that notch 32 has a depth to position base end stop surface 38 at a depth which will trap hinge tab wall 28 between pivot point 16 and saddle or pin 22. Thus, pivoting of door structure 14 around point 16 will not unsnap the gripping fingers 26, 26a from pivot pin 22, but instead, will pivot tab 28 in an upward direction about point 16 which is at an angle sufficient to prevent unsnapping of hinge 20.

As can be seen in FIG. 3C, door structure 14 is at an angle θ when end stop surface 15 engages notch wall or end stop surface 38. As the angle θ increases, the component of force 50 in an X direction, away from pivot pin 22, decreases and the upward tilt of tab 28 increases. When the angle θ is small, as will be discussed below in connection with FIG. 3B, the X component of force 50 is large and the door will be pried off pivot pin 22.

In a broad aspect, therefore, the snap hinge assembly of the present invention is provided with over-travel end stop surfaces which are positioned to interengage each other only after the door has been pivoted beyond an angle θ at which it will be pried off pivot saddle 22. The exact angle θ will depend upon the specific door and hinge embodiment, however, for most embodiments, once θ reaches about 40 to 45°, tab 28 will be trapped between pin 22 and pivot point 16. It is believed that the angle θ may be able to be reduced to as low as 30 to 35°, particularly when the end stop surfaces include a vertical force-supporting shoulder, as will be discussed below.

Returning now to FIG. 3C, once stop surface 15 engages notch wall 38, the downward vertical component of force 50 will tend to cause edge of surface 15 to slide downwardly along wall 38. In the preferred embodiment of the invention, an upwardly facing end stop surface or shoulder 38a is provided in notch 32 to limit downward sliding of surface 15 on vertical wall 38. Thus, a heel portion 33a of door wall 33 engages upwardly facing shoulder 38 at a second pivot point 16a. Engagement of heel 33a and shoulder 38a prevents further downward sliding of the door and causes pivoting of the door assembly about pivot point 16a, rather than point 16. Moreover, shoulder 38a is positioned to engage heel 33a before any substantial upward loading of fingers 26, 26a occurs as a result of downward sliding of the door. The provision of shoulder 38a, therefore, reduces vertical upward loading of fingers 26, 26a, which tends to unsnap or pry open the fingers.

Once the door starts to pivot about point 16a, tab 28 is rotated in a clockwise direction up against pivot pin or saddle 22. Instead of loading gripping fingers 26, 26a, therefore, the present assembly causes tab 28 to be pivoted up against pin 22 in a manner which prevents unsnapping of the hinge assembly.

Comparison of FIGS. 3B and 3C illustrates further how the end stopping surfaces are positioned to prevent unsnapping. In FIG. 3B, an imaginary plane 18 is shown which would represent mounts 30 without notches 32. If such a configuration were used, the door end stop surface 15 would engage the mount 30 at pivot point 18a. Since there is no shoulder which would engage heel 33a, the door would tend to slide downwardly until fingers 26, 26a stopped downward displacement, thus loading the fingers upwardly. The door would then pivot about point 18a, and since the angle θ between a vertical plane and the door is low, the X component of force 50 would be relatively high. The reaction force in the X direction at pivot point 18a and the X component of force 50 would have to be resisted by the reaction force of pivot pin 22 on fingers 26, 26a. The result is the generation of a high reaction force in the X direction on fingers 26, 26a while they are upwardly loaded, and for relatively modest forces 50, the door will be pried off the pivot saddle.

Returning now to FIG. 3C, it also will be seen that the angle θ is much larger than in FIG. 3B. This has two effects. First, the Y component of force 50 is greatly increased, but that is supported by upwardly facing shoulder 38a, not fingers 26, 26a, as would be the case in FIG. 3B. Second, the X component of force 50 will be significantly increased, but so is the opposing X component of the reaction force of the pin 22 on tab 28. Moreover, tab 28 is now upwardly tilted to a point at which it is trapped between pin 22 and pivot point 33a.

In FIG. 3B, a shoulder at point 18a, which prevented downward sliding, would not prevent unsnapping of hinge 20 because the angle θ is sufficiently low that tab 28 would not be trapped between pin 22 and pivot point 18. The high X component of force 50 and low angle of tab 28 would unsnap the door from the base.

FIG. 3D illustrates the present invention further by showing a modified form of the invention in which upward facing surface 38b is sufficiently low that the assembly is unsupported by the bottom of notch 32. This assembly will load the gripping finger 26, 26a and it will pivot about point 16, not a second pivot point 16a as shown in FIG. 3C. If end stop surface 38 is sufficiently deep, angle θ alone will be large enough to trap tab 28 between pin 22 and pivot point 16. An angle of 45° does effect such trapping, and again it is believed that lesser angles may suffice, although loading of finger 26, 26a tends to increase the likelihood of unsnapping.

As was the case for the embodiment of FIG. 3C, the door in FIG. 3D must be rotatable beyond low angles θ at which the high X component of the over-travel force 50 on the door will cause prying of the door off pivot saddle 22.

Accordingly, notching mounts 30 to change the angle of the reaction forces around pin 22 allows door structure 14 to be pivoted to a fully open position which is beyond a position at which the end stop surfaces will unsnap the present hinge assembly.

Having set forth the preferred apparatus, the preferred method of hingedly mounting a door to a base by a snap-acting hinge assembly can be set forth.

The present method prevents the hinged door structure 14 from snapping apart from base 12 when the door is in a fully opened position and interengagement of the over-travel stopping surfaces 15 and 38 occurs. The method includes the steps of either mounting, or monolithically forming, a resilient snap-acting gripping assembly 24 on one of base 12 and door structure 14, and either mounting, or monolithically forming, pivot saddle 22 on the other of base 12 and door structure 14. The most preferred method is to monolithically form the hinge components 22 and 24 on door structure 14 and housing 12, respectively. The method further includes the step of positioning end stop surfaces 15 and 38 (and surfaces 38a and 33a) on the door and housing for interengagement to produce reaction forces oriented so as to prevent unsnapping of the door from the base. The final step in the method is to slidably resiliently snap gripping assembly 24 over pivot saddle 22.

The foregoing description of specific embodiments of the present invention have been presented for purposes of illustration and description. They are not intended to be exhaustive or to limit the invention to the precise forms disclosed, and obviously many modifications and variations are possible in light of the above teaching. It is intended that the scope of the invention be defined by the claims appended hereto when read and interpreted according to accepted legal principles.

What is claimed is:

1. An enclosure structure comprising:
    a first structure;
    a second structure;
    a hinge assembly pivotally mounting the second structure to the first structure and including:
        (i) a pivot saddle mounted to one of the first structure and the second structure;
        (ii) a snap-acting gripping assembly mounted to the other of the first structure and the second structure, the gripping assembly being formed to slidably and resiliently snap into and out of gripping engagement with the pivot saddle and the gripping assembly and the pivot saddle being formed for pivoting of the gripping assembly around the pivot saddle while in gripping engagement therewith from a closed position of the second structure to an open position of the second structure; and
        (iii) the second structure and first structure each further having end stop surfaces engaging each other in the open position to prevent over-travel, with the end stop surfaces being positioned to produce reaction forces, when the second structure is in the open position, urging the gripping assembly and the pivot saddle together in a direction preventing unsnapping of the gripping assembly from the pivot saddle by movement in a direction aligned with an unmounting direction, wherein,
the end stop surface of the first structure is positioned to engage the end stop surface of the second structure at a position angularly beyond a position at which the second structure would be unsnapped from the base structure, which angle is at least 30°.

2. The enclosure structure of claim 1 wherein, the first structure is a base structure and the second structure is a door structure, and
said pivot saddle is carried by the base structure and the snap-acting gripping assembly is carried by the door structure.

3. The enclosure structure of claim 2 wherein,
said base structure is a computer housing, and the door structure is a movable panel on the computer housing.

4. The enclosure structure of claim 2 wherein,
the snap-acting gripping assembly includes a pair of spaced-apart resilient gripping fingers mounted in spaced relation to an opposed wall to define a saddle-receiving socket therebetween.

5. The enclosure structure of claim 2 wherein,
the door structure snaps onto the base structure in a mounting direction that is generally parallel to a direction in which the snap-acting gripping assembly extends.

6. The enclosure structure of claim 1 wherein,
the pivot saddle is monolithically formed with the first structure; and
the snap-acting gripping assembly is monolithically formed with the second structure.

7. The enclosure structure of claim 6 wherein,
the first structure and pivot saddle are formed of a molded plastic; and
the snap-acting gripping assembly and second structure are formed of a molded plastic.

8. The enclosure structure of claim 1 wherein,
the pivot saddle is a substantially cylindrical member mounted by a saddle support mount spanning between the cylindrical member and the one of the second structure and the first structure.

9. The enclosure structure of claim 8 wherein, the first structure is a base structure and the second structure is a door structure, and
the end stop surface on the base structure is provided by the saddle support mount and the end stop surface on the door structure contacts the end stop surface on the saddle support mount when the door structure is in the open position.

10. The enclosure structure of claim 9 wherein,
the saddle support mount is formed with a notch therein dimensioned to receive the end stop surface of the door structure when the door structure is pivoted beyond a position which would produce unsnapping of the door structure.

11. The enclosure structure of claim 10 wherein,
the end stop surface in the door structure is provided at a base of a pair of slots positioned proximate and in opposed relation to the gripping assembly.

12. An enclosure structure comprising:

a first structure;

a second structure;

a hinge assembly pivotally mounting the second structure to the first structure in a manner creating an open position and a closed position between the first and second structures and including:
(i) a pivot saddle mounted to one of the first structure and the second structure;
(ii) a snap-acting gripping assembly mounted to the other of the first structure and the second structure, the gripping assembly being formed to slidably and resiliently snap into and out of gripping engagement with the pivot saddle, and the gripping assembly and the pivot saddle being formed for pivoting of the gripping assembly around the pivot saddle while in gripping engagement therewith from the closed position to the open position; and
(iii) the second structure and first structure each further having end stop surfaces engaging each other in the open position to prevent over-travel, with the end stop surfaces being positioned to produce reaction forces, when in the open position, urging the gripping assembly and the pivot saddle together in a direction preventing unsnapping of the gripping assembly from the pivot saddle by movement in a direction aligned with an unmounting direction, wherein,
the end stop surface of the first structure includes a shoulder positioned to engage the second structure prior to loading of the gripping assembly.

13. The enclosure structure of claim 12 wherein, said pivot saddle is carried by the second structure and the snap-acting gripping assembly is carried by the first structure.

14. The enclosure structure of claim 13 wherein, the pivot saddle is monolithically formed with the second structure; and the snap-acting gripping assembly is monolithically formed with the first structure.

15. The enclosure structure of claim 14 wherein, the second structure and pivot saddle are formed of a molded plastic; and the snap-acting gripping assembly and the first structure are formed of a molded plastic.

16. The enclosure structure of claim 12 wherein, said second structure is a computer housing, and the first structure is a movable panel on the computer housing.

17. The enclosure structure of claim 12 wherein, the snap-acting gripping assembly includes a pair of spaced-apart resilient gripping fingers mounted in spaced relation to an opposed wall to define a saddle-receiving socket therebetween.

18. The enclosure structure of claim 17 wherein, the first structure snaps onto the second structure in a mounting direction that is generally parallel to a direction in which the snap-acting gripping assembly extends.

* * * * *